United States Patent
Kikinis

(10) Patent No.: US 8,756,635 B2
(45) Date of Patent: Jun. 17, 2014

(54) REMOTE CONTROL OF PROGRAM SCHEDULING

(75) Inventor: Dan Kikinis, Saratoga, CA (US)

(73) Assignee: JLB Ventures, LLC., Washington, DC (US)

(*) Notice: Subject to any disclaimer, the term of this patent is extended or adjusted under 35 U.S.C. 154(b) by 2192 days.

(21) Appl. No.: 09/875,546

(22) Filed: Jun. 5, 2001

(65) Prior Publication Data

US 2002/0019980 A1    Feb. 14, 2002

Related U.S. Application Data

(60) Provisional application No. 60/215,681, filed on Jun. 30, 2000.

(51) Int. Cl.
*H04N 5/445* (2011.01)
*G06F 3/00* (2006.01)
*G06F 13/00* (2006.01)

(52) U.S. Cl.
USPC .............. 725/58; 725/39; 725/89; 725/100; 725/131; 725/142

(58) Field of Classification Search
USPC ................................................ 725/89, 58
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,307,055 A * | 4/1994 | Baskin et al. | 345/2.2 |
| 5,414,773 A | 5/1995 | Handelman | |
| 5,479,268 A | 12/1995 | Young et al. | |
| 5,485,197 A | 1/1996 | Hoarty | |
| 5,526,034 A | 6/1996 | Hoarty | |
| 5,532,754 A | 7/1996 | Young et al. | |
| 5,537,152 A | 7/1996 | Ishikawa | |
| 5,539,822 A | 7/1996 | Lett et al. | |
| 5,550,576 A | 8/1996 | Klosterman | |
| 5,550,578 A | 8/1996 | Hoarty | |
| 5,619,247 A | 4/1997 | Russo | |
| 5,679,943 A * | 10/1997 | Schultz et al. | 235/472.02 |
| 5,684,525 A | 11/1997 | Klosterman | |
| 5,704,837 A | 1/1998 | Iwasaki et al. | |
| 5,710,605 A * | 1/1998 | Nelson | 348/734 |
| 5,724,492 A | 3/1998 | Matthews, III et al. | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |
| 5,828,945 A | 10/1998 | Klosterman | |

(Continued)

FOREIGN PATENT DOCUMENTS

JP  410093880  4/1998
WO  WO 00/01149  1/2000

OTHER PUBLICATIONS

Microsoft Computer Dictionary, 4th Edition, p. 336, Definition of PDA.*

*Primary Examiner* — Jason Salce
(74) *Attorney, Agent, or Firm* — Banner & Witcoff, Ltd.

(57) ABSTRACT

A method and apparatus for a first video display coupled with a receiving system to display a video broadcast, and a computing device having a second display displaying an Electronic Programming Guide (EPG) corresponding to the video broadcast, wherein the EPG and the video broadcast are displayed concurrently.

19 Claims, 3 Drawing Sheets

(56) References Cited

U.S. PATENT DOCUMENTS

| | | | |
|---|---|---|---|
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,936,611 A | 8/1999 | Yoshida | |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,394 A * | 12/1999 | Schein et al. | 725/39 |
| 6,002,403 A | 12/1999 | Sugiyama et al. | |
| 6,002,450 A | 12/1999 | Darbee et al. | |
| 6,020,881 A | 2/2000 | Naughton et al. | |
| 6,029,195 A | 2/2000 | Herz | |
| 6,034,678 A | 3/2000 | Hoarty | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |
| 6,078,348 A | 6/2000 | Klosterman et al. | |
| 6,081,271 A | 6/2000 | Bardon et al. | |
| 6,100,883 A | 8/2000 | Hoarty | |
| 6,130,726 A * | 10/2000 | Darbee et al. | 348/734 |
| 6,167,188 A | 12/2000 | Young et al. | |
| 6,177,931 B1 | 1/2001 | Alexander et al. | |
| 6,185,360 B1 | 2/2001 | Inoue et al. | |
| 6,205,485 B1 | 3/2001 | Kikinis | |
| 6,205,582 B1 | 3/2001 | Hoarty | |
| 6,233,389 B1 | 5/2001 | Barton et al. | |
| 6,243,039 B1 | 6/2001 | Elliot | |
| 6,246,441 B1 * | 6/2001 | Terakado et al. | 348/552 |
| 6,271,831 B1 | 8/2001 | Escobosa et al. | |
| 6,310,609 B1 | 10/2001 | Morgenthaler | |
| 6,313,887 B1 * | 11/2001 | Gudorf | 348/734 |
| 6,401,059 B1 * | 6/2002 | Shen et al. | 703/27 |
| 6,437,836 B1 * | 8/2002 | Huang et al. | 348/734 |
| 6,473,097 B1 * | 10/2002 | Elliott | 715/733 |
| 6,484,011 B1 | 11/2002 | Thompson et al. | |
| 6,493,037 B1 | 12/2002 | Raiyat | |
| 6,501,516 B1 | 12/2002 | Clapper | |
| 6,507,306 B1 | 1/2003 | Griesau et al. | |
| 6,509,908 B1 * | 1/2003 | Croy et al. | 715/716 |
| 6,532,592 B1 | 3/2003 | Shintani et al. | 725/141 |
| 6,549,929 B1 * | 4/2003 | Sullivan | 718/102 |
| 6,556,771 B1 * | 4/2003 | Kim | 386/83 |
| 6,567,984 B1 * | 5/2003 | Allport | 725/110 |
| 6,628,729 B1 * | 9/2003 | Sorensen | 375/316 |
| 6,637,029 B1 * | 10/2003 | Maissel et al. | 725/46 |
| 6,745,223 B1 | 6/2004 | Nobakht et al. | |
| 6,754,904 B1 | 6/2004 | Cooper et al. | |
| 6,774,926 B1 * | 8/2004 | Ellis et al. | 348/14.01 |
| 6,853,308 B1 | 2/2005 | Dustin | |
| 6,862,741 B1 * | 3/2005 | Grooters | 725/39 |
| 7,096,185 B2 | 8/2006 | Reichardt et al. | |
| 7,237,253 B1 | 6/2007 | Blackketter et al. | |
| 7,426,467 B2 | 9/2008 | Nashida et al. | |
| 2001/0047517 A1 | 11/2001 | Christopoulos et al. | |
| 2002/0053084 A1 * | 5/2002 | Escobar et al. | 725/47 |
| 2005/0028208 A1 * | 2/2005 | Ellis et al. | 725/58 |

* cited by examiner

REMOTE CONTROL OF PROGRAM SCHEDULING

Applicant claims priority to provisional application Ser. No. 60/215,681, filed Jun. 30, 2000, which is incorporated by reference herein.

FIELD OF THE INVENTION

The invention relates to the field of electronic programming guides (EPGs). More specifically, the invention relates to providing a remotely controlled electronic programming guide.

BACKGROUND OF THE INVENTION

An Electronic Programming Guide (EPG) displays information about programs a viewer is currently watching as well as information about other programs on different channels or at different times. The first EPGs were typically displayed on one channel of a cable television system. These early EPGs were simple, displaying short program descriptions and scrolling past the screen at a predetermined rate. Also, these EPGs typically did not allow for user interaction. More recent digital EPGs allow for the user to interact with the programming schedule, and to view programs while scanning the guide. However, digital EPGs still typically rely on the television to display the EPG.

Currently, EPGs are displayed only on the primary video display, typically a television, itself. This is because a television is usually the most expensive component in a home entertainment system, and further because until recently a television was the only display device in many homes. As a result, the television is used to show both the programs themselves as well as the EPG.

Typically, an EPG will be displayed in one of two ways. It will either be displayed using the full television screen, completely preempting the programming selection, or the EPG may occupy only a portion of the screen as an overlay, the rest of the screen used to display the current program. Where an EPG only occupies a portion of the screen, however, it may be difficult to read because of the small size of the text, or may not provide much information about the current selection or other programs. Additionally, the main program is interrupted by the overlay.

This method of displaying programming information can have several other disadvantages as well. When there are several viewers, if one decides to view the EPG, all other viewers must wait until the one using the EPG is finished. This interruption may be quite inconvenient for the other viewers.

What is needed is a method of displaying programming information that is neither difficult to read, nor disrupts others when there are multiple viewers.

SUMMARY OF THE INVENTION

The present invention provides a method and apparatus for displaying an electronic programming guide (EPG) on a device other than a primary video display.

In one embodiment, the EPG may be displayed on a display screen coupled to a computing device, so that one viewer may browse the EPG, while other viewers may continue to watch the currently selected program on the primary display. The computing device may also allow a user to participate in interactive television. Additionally, the user may still display the EPG on the primary display if they so wish.

BRIEF DESCRIPTION OF THE DRAWINGS

The present invention is illustrated by way of example and not limitation in the figures of the accompanying drawings, in which.

DETAILED DESCRIPTION

One embodiment provides a method and apparatus for displaying an Electronic Programming Guide (EPG) on a display device other than that which displays the program. In the following description, for purposes of explanation, specific details are set forth to provide a thorough understanding of the present invention. However, it will be apparent to one skilled in the art that these specific details are not required in order to practice the present invention.

An EPG allows a user to perform a range of functions that may be useful when watching television. Commonly assigned U.S. patent application Ser. No. 09/488,361, filed Jan. 16, 2000, describes in more detail the functions of an EPG and is hereby incorporated by reference.

The main function of an EPG is to allow a user to view program listings sorted by channel and time. Some EPGs allow a user to browse through the listings, and to get detailed information about specific programs. EPGs may also allow a user to select certain channels or programs in which the user is particularly interested. Additionally, an EPG may control a recording device, and start recording when programs selected by the user are shown.

The typical television viewer now has many devices that have display screens, such as PCs, PDAs, web phones, etc., in addition to their television. Current EPGs are displayed on the television screen itself. This can lead to problems when there is more than one viewer, because viewers other than the one operating the EPG may not wish to view the EPG. Problems may also arise when the EPG attempts to display both the guide and a television program at the same time, because either the text may be too small or there may be too little information displayed. New display devices, such as PCs and PDAs give the user the opportunity to view the programming guide on an second screen, eliminating the problems associated with displaying an EPG and programs on the same screen.

Figure 1:
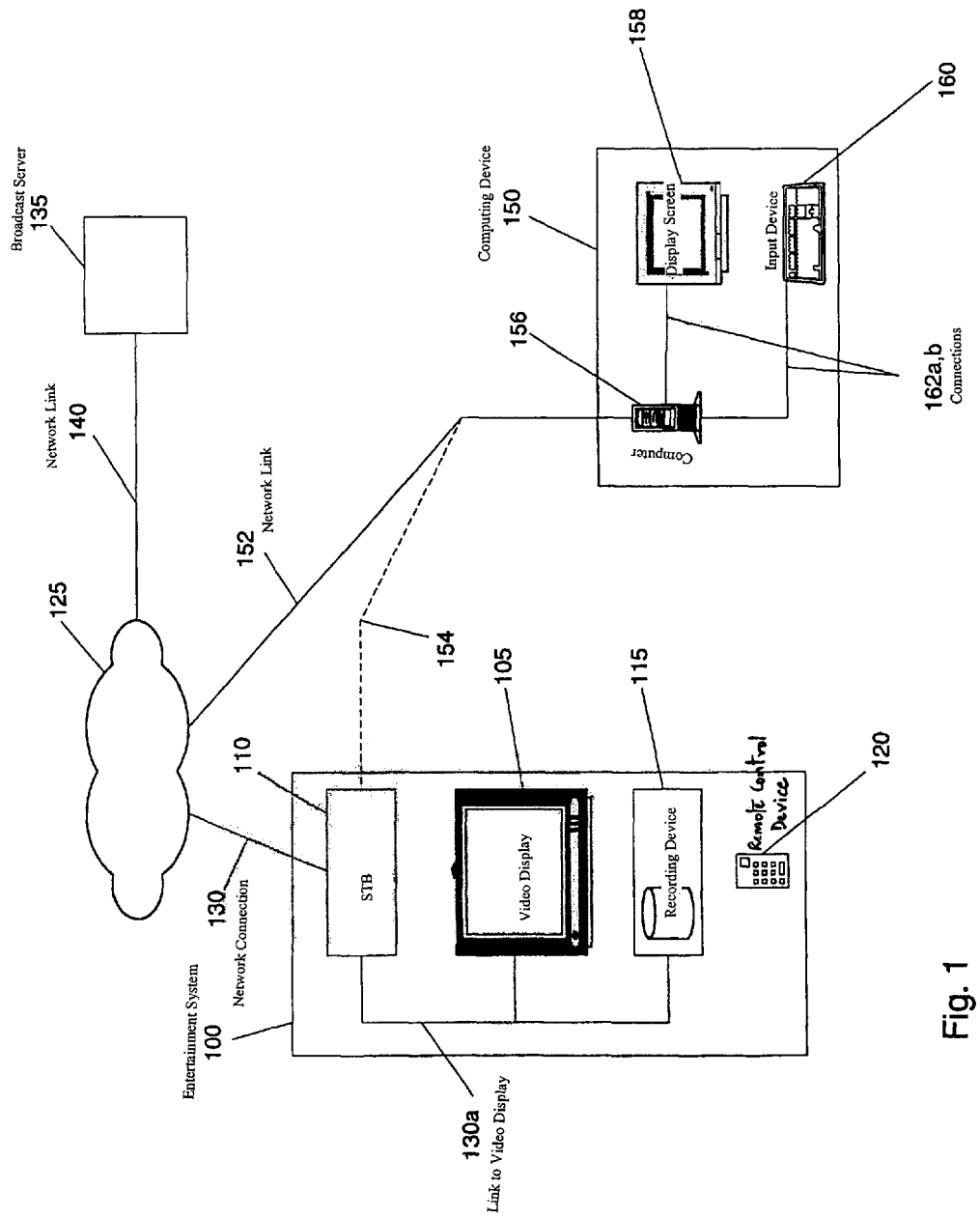
FIG. 1 illustrates an entertainment system with an electronic programming guide displayed on a remote computing device.

FIG. 1 illustrates an apparatus for displaying an EPG on a display other than the primary display according to one embodiment. Entertainment system 100 is an exemplary entertainment system which allows a user to watch television, record television programs, and perform various other functions.

As shown, entertainment system 100 includes a television or other video display 105, a set-top box (STB) 110, a digital or other recording device 115, and a remote control device 120.

Video display 105 can be a television, plasma screen, liquid crystal display (LCD) or any other device capable of interpreting and displaying signals sent by set top box 110 (STB).

STB 110 is receives and descrambles cable television and other signals, allows for interaction with the viewer, and transmits the resulting signals to video display 105. Recording device 115 may be any one of or a combination of any one of a number of devices including video cassette recorders (VCRs), hard drives, digital versatile disc-random access memory (DVD-RAM) recorders, etc. Video display 105, STB 110 and recording device 115 may also be combined in any fashion.

Set top box (STB) 110 can receive signals from network 125 through network connection 130. It can also receive information from link 130a to video display 105 and recording device 115. Remote control device 120 is capable of controlling the functions of the various components of entertainment system 100 using infrared or other transmission means.

Network 125 may consist of a single network or a group of networks such as the Internet. Network connection 130 can deliver signals to STB 110 over a local area network (LAN), a wide area network (WAN), satellite broadcast, or other data transmission means. Network connection 130 can deliver analog, digital or HDTV signals, or any combination thereof. Network connection 130 may also allow unidirectional or bi-directional Internet access.

In one embodiment, network 125 would comprise a single high-bandwidth digital network that allows both digital video streams and Internet access as well as other services to run on the same network. In another embodiment, the network connection 130 would comprise fiber optic cable, although it is clear that any technique of connecting the network may be employed.

Although only a single network cloud 125 is shown in FIG. 1, in other embodiments, any number of different types information providers and network connections may be utilized. For example, broadcast server 135 has programs which can be viewed using entertainment system 100. Broadcast server 135 delivers information to network 125 through network link 140, and eventually to STB 110.

Computing device 150 is coupled with network 125 through network link 152. Computing device 150 may also be coupled with set top box 110 via network link 154. Because set top box 110 has its own network connection 130, it is also possible to forgo network connection 152 and route network access for computing device 150 through set top box 110.

Computing device 150 comprises a computer 156, a display screen 158, an input device 160, and connections 162a and 162b. Computer 156 may be any device, such as a Personal Computer (PC), a Personal Digital Assistant (PDA), or a web phone, capable of processing commands necessary to display output on display screen 158. Display screen 158 may be a computer monitor or an LCD screen, or any other device capable of displaying the output of computer 156.

Input device 160 may be a keyboard, mouse, joystick, writing tablet, or any other means of inputting data into computer 156. The components of computer 156 communicate with each other through connections 162a and 162b, although any number of additional connections may be added for additional peripherals and for additional connections between the already enumerated components.

As shown in FIG. 1, computing device 150 is simplified for purposes of explanation. Any number of additional components may be added to computing device 150 beyond those necessary for use with the invention.

As shown in FIG. 1, it is possible for several people to watch programming on video display 105 while one or more other persons uses computing device 150 to view an EPG on display screen 158. People viewing EPG programming information on the computing device 150 can make selections and may even view local previews on the display screen 158. As a result, the programming displayed on video display 105 is undisturbed, and those perusing an EPG using computing device 150 can do so at their leisure. Also, because the EPG is shown on computing device 150, it is more easily customized and can be seen more clearly.

Input device 160 can be used to select programs to be watched on video display 105, or to otherwise browse through the EPG. In addition, a cable television provider sending programming to set top box 110 may have preset selections to send to computing device 150. A user may also use input device 160 to make viewing selections, preprogram reminders for viewing selections, program recording events, or perform any other function typical of Electronic Programming Guides (EPGs).

Recording device 115 can also be configured through the EPG to start recording slightly before a program is scheduled to begin and to end recording slightly after a program is scheduled to end in order to compensate for scheduling inaccuracies. A server, such as broadcast server 135 may also control these functions.

STB 110 may also provide for interactive functions such as online shopping, contests, games, chat, etc. Either input device 160 or remote control device 120 can be used to create input for the interactive functions of STB 110.

A user of the EPG displayed on computing device 105 may also, through input device 160, display portions of or the entire EPG on video display 105. This way, it is possible that a user may share programming information with all viewers, and thus the invention retains all of the benefits of previous EPGs displayed on a television. This also allows those who have poor vision, or are otherwise unable to use display screen 158, to use the EPG.

Figure 2:
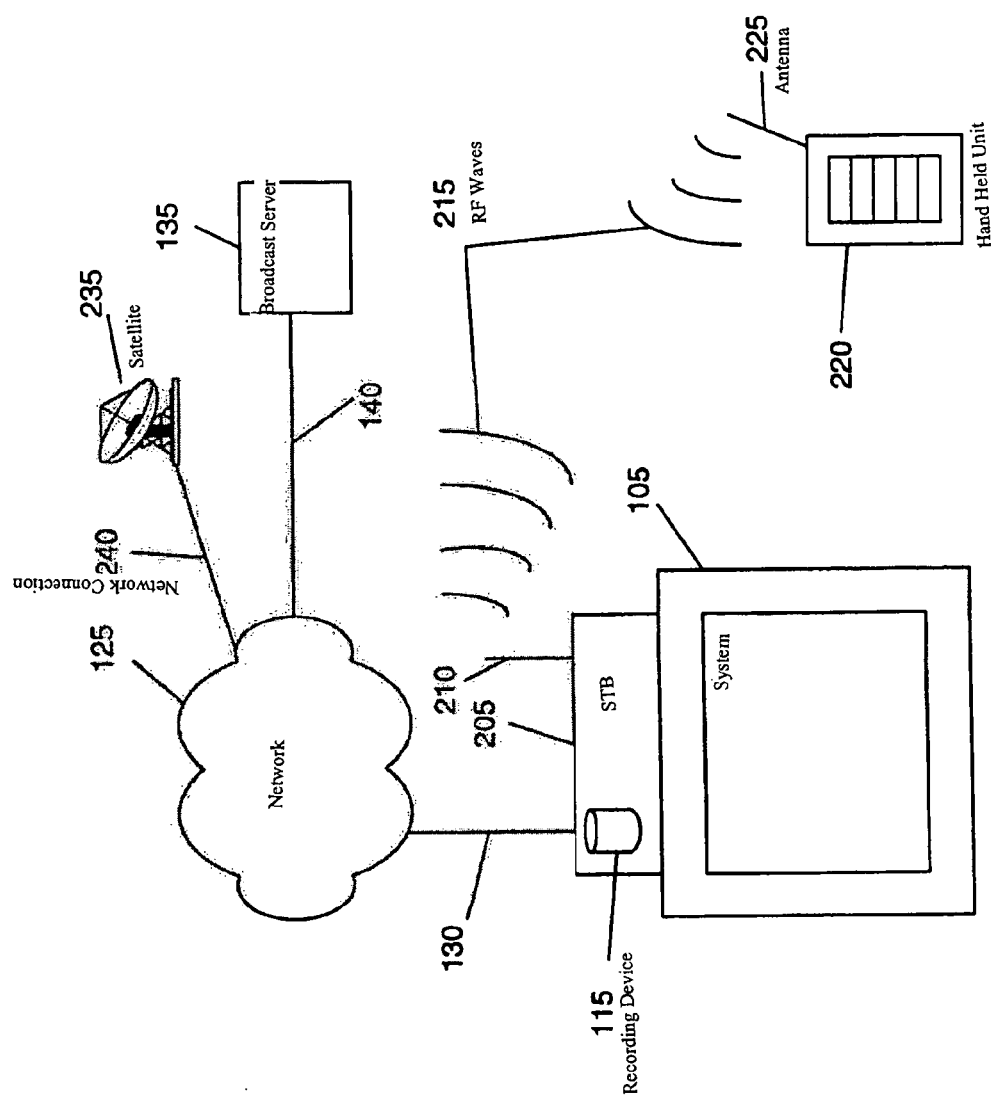
FIG. 2 illustrates an entertainment system with an electronic programming guide displayed on a wireless computing device.

In another embodiment, an EPG could be displayed on a portable computing device. FIG. 2 illustrates an exemplary entertainment system with an EPG displayed on a wireless computing device.

Set top box (STB) 205 has an integrated antenna 210, which transmits RF waves 215. RF waves 215 can be received by hand held unit 220 through antenna 225. Hand held unit 220, could, for example, be a personal digital assistant (PDA). Hand held unit 220 could be equipped with a wireless interface such as Bluetooth™ to communicate with STB 205.

A wireless hand held device, such as hand held unit 220 allows for a great deal of flexibility. A user may move about the room which contains video display 105 and be able to control the functions of the EPG from any point. When using a wireless hand held device to control the EPG, the device may also assume the functions of remote control device 120.

FIG. 2 also shows a satellite receiver 235 connected with network 125 through network connection 240. Satellite receiver 235 can receive satellite signals, in addition to those already transmitted through the network from, e.g., broadcast server 135. Any one of a number of methods of transmitting signals to STB 205 may be employed.

Figure 3:
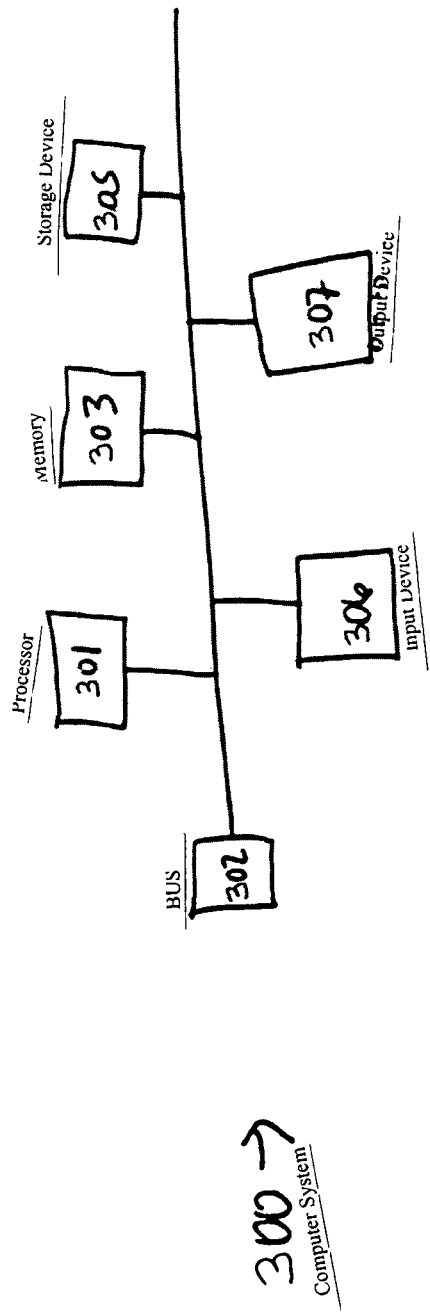
FIG. 3 is one example of a computer system according to an embodiment of the present invention.

The system and method described herein may be integrated into advanced Internet- or network-based knowledge systems as related to information retrieval, information extraction, and question and answer systems. FIG. 3 is an example of one embodiment of a computer system 300. The system shown has a processor 301 coupled to a bus 302. Also shown coupled to the bus 302 is a memory 303 which may contain instructions to perform the method described herein. Additional components shown coupled to the bus 302 are a storage device 305 (such as a hard drive, floppy drive, CD-ROM, DVD-ROM, etc.), an input device 306 (such as a keyboard, mouse, light pen, barcode reader, scanner, microphone, joystick, etc.), and an output device 307 (such as a printer, monitor, speakers, etc.). Of course, an exemplary computer system could have more components than these or a subset of the components listed.

The system and method described herein may be stored in the memory of a computer system (i.e., a set-top box) as a set of instructions to be executed, as shown by way of example in FIG. 3. In addition, the instructions to perform the system and method described herein may alternatively be stored on other forms of machine-readable media, including magnetic and optical disks. For example, the system and method of the present invention may be stored on machine-readable media, such as magnetic disks or optical disks, which are accessible via a disk drive (or computer-readable medium drive). Further, the instructions may be downloaded into a computing device over a data network in the form of a compiled and linked version.

Alternatively, the logic to perform the system and method described herein may be implemented in additional computer and/or machine-readable media such as discrete hardware components as large-scale integrated circuits (LSI's), application specific integrated circuits (ASIC's), and firmware such as electrically erasable programmable read-only memory (EEPROM's).

Although the foregoing description and accompanying figures discuss and illustrate specific embodiments, it should be appreciated that the present invention is to be measured only in terms of the claims that follow.

What is claimed is:

1. A system comprising:
a receiving system configured to receive broadcast programs from a broadcast server via a high-bandwidth digital network comprising at least one of a wide area network (WAN) or satellite broadcast network;
a video display configured to communicate with the receiving system and to display a video broadcast; and
a computing device configured to communicate with the broadcast server and the receiving system via the high-bandwidth digital network, the computing device having a second display configured to receive and concurrently display an Electronic Programming Guide (EPG) corresponding to the video broadcast,
wherein the computing device does not have a direct communication link with the receiving system, but is configured to communicate with the receiving system via the high-bandwidth digital network, and
wherein the computing device is configured to transmit a signal to the receiving system via the WAN or satellite broadcast network corresponding to an instruction to display at least a portion of the EPG on the video display concurrently while displaying at least a portion of the EPG on the second display.

2. The system of claim 1, wherein the computing device is a Personal Digital Assistant (PDA).

3. The system of claim 1, wherein the computing device is a Web Phone.

4. The system of claim 1, wherein the computing device and the video display are configured such that the entire EPG is displayed on the video display concurrently while the entire EPG is displayed on the second display.

5. The system of claim 1, wherein the computing device and the video display are configured such that less than the entire EPG is displayed on the video display concurrently while at least a portion of the EPG is displayed on the second display.

6. The system of claim 1, wherein the computing device is further configured to display a video clip preview of a broadcast program displayed in the EPG.

7. The system of claim 6, wherein the computing device and the video display are configured such that the video clip preview of the broadcast program is displayed on the computing device concurrently while a separate broadcast program is displayed on the video display.

8. A method comprising:
receiving, at a receiving system, broadcast programs from a broadcast server via a high-bandwidth digital network comprising at least one of a wide area network (WAN) or satellite broadcast network;
transmitting, by the receiving system, a video broadcast to a first video display configured to communicate with the receiving system;
receiving, at a computing device having a second video display, program listing data from the broadcast server via the high-bandwidth digital network, the program listing data associated with a video broadcast being displayed on the first video display;
displaying, by the computing device, on the second video display an Electronic Programming Guide (EPG) based on the received program listing data and corresponding to the video broadcast being displaying on the first video display;
receiving user input at the computing device corresponding to a request to display at least a portion of the EPG on the first video display while concurrently displaying at least a portion of the EPG on the second video display;
establishing communication between the computing device and the receiving system, wherein the computing device does not have a direct communication link with the receiving system, but is configured to communicate with the receiving system via the high-bandwidth digital network; and
transmitting, by the computing device, a signal to the receiving system via the WAN or satellite broadcast network, the signal corresponding to an instruction to display at least a portion of the EPG on the first video display concurrently while displaying at least a portion of the EPG on the second video display.

9. The method of claim 8, wherein the computing device is a Personal Digital Assistant (PDA).

10. The method of claim 8, wherein the computing device is a Web Phone.

11. The method of claim 8, further comprising displaying the entire EPG on the video display concurrently while displaying the entire EPG on the second display.

12. The method of claim 8, further comprising displaying less than the entire EPG on the video display concurrently while displaying at least a portion of the EPG on the second display.

13. The method of claim 8, further comprising displaying on the second display a video clip preview of a broadcast program displayed in the EPG.

14. The method of claim 13, wherein the video clip preview of the broadcast program is displayed on the second display concurrently while a separate broadcast program is displayed on the first video display.

15. A non-transitory machine readable medium having stored thereon a set of instructions, which when executed cause a computing device to:
receive, at a computing device, program listing data associated with a video broadcast being displaying by a receiving system on a first video display, the program listing data received from a broadcast server via a high-bandwidth digital network comprising at least one of a wide area network (WAN) or satellite broadcast network;
display on a second display an Electronic Programming Guide (EPG) based on the received program listing data and corresponding to the video broadcast being displayed on the first video display;
receive, at the computing device, user input corresponding to a request to display at least a portion of the EPG on the first video display while concurrently displaying at least a portion of the EPG on the second display;
establish communication between the computing device and the receiving system, wherein the computing device does not have a direct communication link with the receiving system, but is configured to communicate with the receiving system via the high-bandwidth digital network; and
transmit, by the computing device, a signal to the receiving system via the WAN or satellite broadcast network, the signal corresponding to an instruction to display at least a portion of the EPG on the first video display concurrently while displaying at least a portion of the EPG on the second video display.

16. The non-transitory machine readable medium of claim 15, wherein the computing device is a Personal Digital Assistant (PDA).

17. The non-transitory machine readable medium of claim 15, wherein the computing device is a Web Phone.

18. The non-transitory machine readable medium of claim 15, the method further comprising displaying the entire EPG on the video display concurrently while displaying the entire EPG on the second display.

19. The non-transitory machine readable medium of claim 15, the method further comprising displaying less than the entire EPG on the video display concurrently while displaying at least a portion of the EPG on the second display.

* * * * *